(12) United States Patent
Duke et al.

(10) Patent No.: US 7,811,344 B1
(45) Date of Patent: Oct. 12, 2010

(54) DOUBLE-VORTEX FLUID SEPARATOR

(76) Inventors: Bobby Ray Duke, 3519 Boyd Ave., Midland, TX (US) 79707; Clarence M. Luxton, 5672 E. Poppy, Gardendale, TX (US) 79758

( * ) Notice: Subject to any disclaimer, the term of this patent is extended or adjusted under 35 U.S.C. 154(b) by 411 days.

(21) Appl. No.: 12/005,827

(22) Filed: Dec. 28, 2007

(51) Int. Cl.
*B01D 45/12* (2006.01)

(52) U.S. Cl. ............................. 55/337; 55/346; 55/349; 55/418; 55/419

(58) Field of Classification Search ............... 55/346, 55/349, 418, 419, 337
See application file for complete search history.

(56) References Cited

U.S. PATENT DOCUMENTS

| | | |
|---|---|---|
| 1,836,004 A | 12/1931 | Becker |
| 2,808,897 A | 10/1957 | Reinsch et al. |
| 3,296,774 A | 1/1967 | Hodgendorn |
| 3,498,028 A | 3/1970 | Trouw |
| 3,581,467 A | 6/1971 | Donnelly |
| 3,605,388 A | 9/1971 | Zuiderweg |
| 3,662,521 A | 5/1972 | Behar et al. |
| 3,930,816 A | 1/1976 | Miczek |
| 4,128,406 A | 12/1978 | Spevack |
| 4,486,203 A | 12/1984 | Rooker |
| 4,838,906 A | 6/1989 | Kiselev |
| 4,859,347 A | 8/1989 | Simon et al. |
| 4,880,451 A | 11/1989 | Konijn |
| 5,145,612 A | 9/1992 | Reay et al. |
| 5,683,629 A | 11/1997 | Konijn |
| 5,714,068 A | 2/1998 | Brown |
| 5,827,357 A * | 10/1998 | Farion .......................... 95/253 |
| 6,514,322 B2 | 2/2003 | West |
| 2002/0005388 A1* | 1/2002 | Romanyszyn ............... 210/787 |
| 2009/0139192 A1* | 6/2009 | Sams et al. ................... 55/418 |

* cited by examiner

*Primary Examiner*—Robert A Hopkins
(74) *Attorney, Agent, or Firm*—www.bobharter.com; Robert J. Harter

(57) ABSTRACT

A fluid separator includes a side-by-side double-vortex fluid generator installed within a pressure vessel. The vortex generator separates the liquid and gas components of the incoming fluid mixture, and the vessel itself helps further separate the liquid into water and oil components, which makes the fluid separator particularly suited for processing fluids extracted from an oil well. The generator includes two diverging vortex tubes each having a polygonal cross-section. Such a cross-section allows the tubes to be formed using a conventional press brake. The vortex tubes also have diverging longitudinal centerlines to help spread the liquid flow pattern discharging into the vessel.

11 Claims, 6 Drawing Sheets

DOUBLE-VORTEX FLUID SEPARATOR

FIELD OF THE INVENTION

The subject invention generally pertains to the separation of gas, oil and water, and more specifically pertains to a vortex-style separator.

BACKGROUND OF RELATED ART

Forcing a fluid mixture of liquid and gas in a helical flow pattern through a cyclone separator or vortex tube can centrifugally separate the liquid from the gas. In the right applications, this process is effective and widely used. Current methods of centrifugal separation, however, have their limitations and drawbacks.

Since the incoming fluid is injected tangentially into the side of a vortex tube, the diameter of the inlet feed pipe is typically smaller than that of the vortex tube. A relatively small diameter inlet pipe creates a flow restriction that can reduce the separator's flow rate capacity. If a larger diameter vortex tube is used to accommodate a larger inlet pipe, the resulting lower flow velocity and larger helix diameter reduces the centrifugal force and thus reduces the vortex tube's ability to separate liquid from gas.

To overcome this problem, multiple small vortex tubes can be used instead of one large one. Such a solution, however, can lead to an awkward assembly of parts with an excessive amount of interconnecting piping.

It can be difficult to design or appropriately size a cyclone separator when the proportions of liquid and gas are unknown or vary widely and sporadically, which is often the case when the incoming fluid is from an oil well. In oil production, the percentages of liquid and gas can range from zero to 100%, which greatly affects the volume rate of flow. Moreover, the specific gravity of the liquid can change depending on the liquid's proportions of oil and water.

Consequently, there is a need for a better liquid/gas separator, particularly for use in the oil industry.

SUMMARY OF THE INVENTION

It is an object of some embodiments of the present invention to provide a side-by-side double-vortex separator, wherein both vortex tubes share a common inlet pipe.

Another object of some embodiments is to use a conventional press brake to form a diverging tube with a polygonal cross-section so that the tube approximates a conical tube.

Another object of some embodiments is join two generally conical tubes such that their longitudinal centerlines diverge, whereby the discharge from each tube points in at least a slightly different direction to help create a calmer pool of liquid into which the separated liquid discharges. The calmer pool of liquid promotes the separation of oil and water and helps avoid remixing the liquid with the previously separated gas.

Another object of some embodiments is to evenly split the flow through a round inlet pipe so that the split flow is evenly distributed between two vortex tubes.

Another object of some embodiments is to withdraw a fluid from an oil well and separate the fluid into three components of water, oil and gas.

Another object of some embodiments is to provide a double-vortex separator that can readily handle fluids with a liquid component that can vary in volume between zero and 100%.

Another object of some embodiments is to feed a double-vortex generator using an inlet pipe that diverges in diameter to controllably reduce the flow velocity before the incoming fluid enters the vortex tubes.

Another object of some embodiments is to provide a side-by-side double-vortex generator that can be readily incorporated into either a vertical or horizontal pressure vessel.

Another object of some embodiments is to provide a side-by-side double-vortex generator that can be fabricated of sheet metal or metal plate.

One or more of these and/or other objects of the invention are provided by a side-by-side double-vortex fluid separator.

DESCRIPTION OF THE PREFERRED EMBODIMENT

Figure 1:
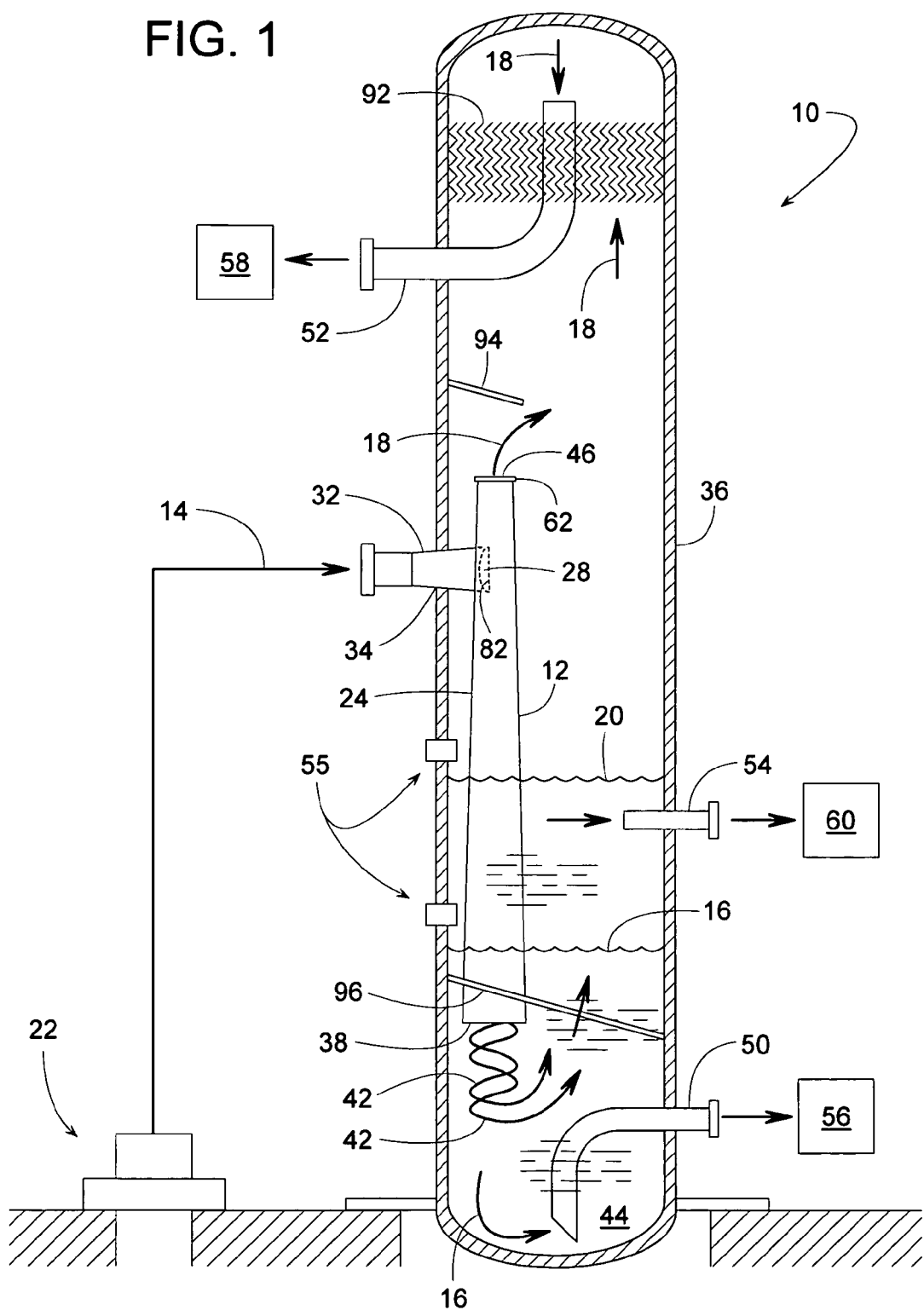
FIG. 1 a side view of a fluid separator with its pressure vessel shown in cross-section.
Figure 2:
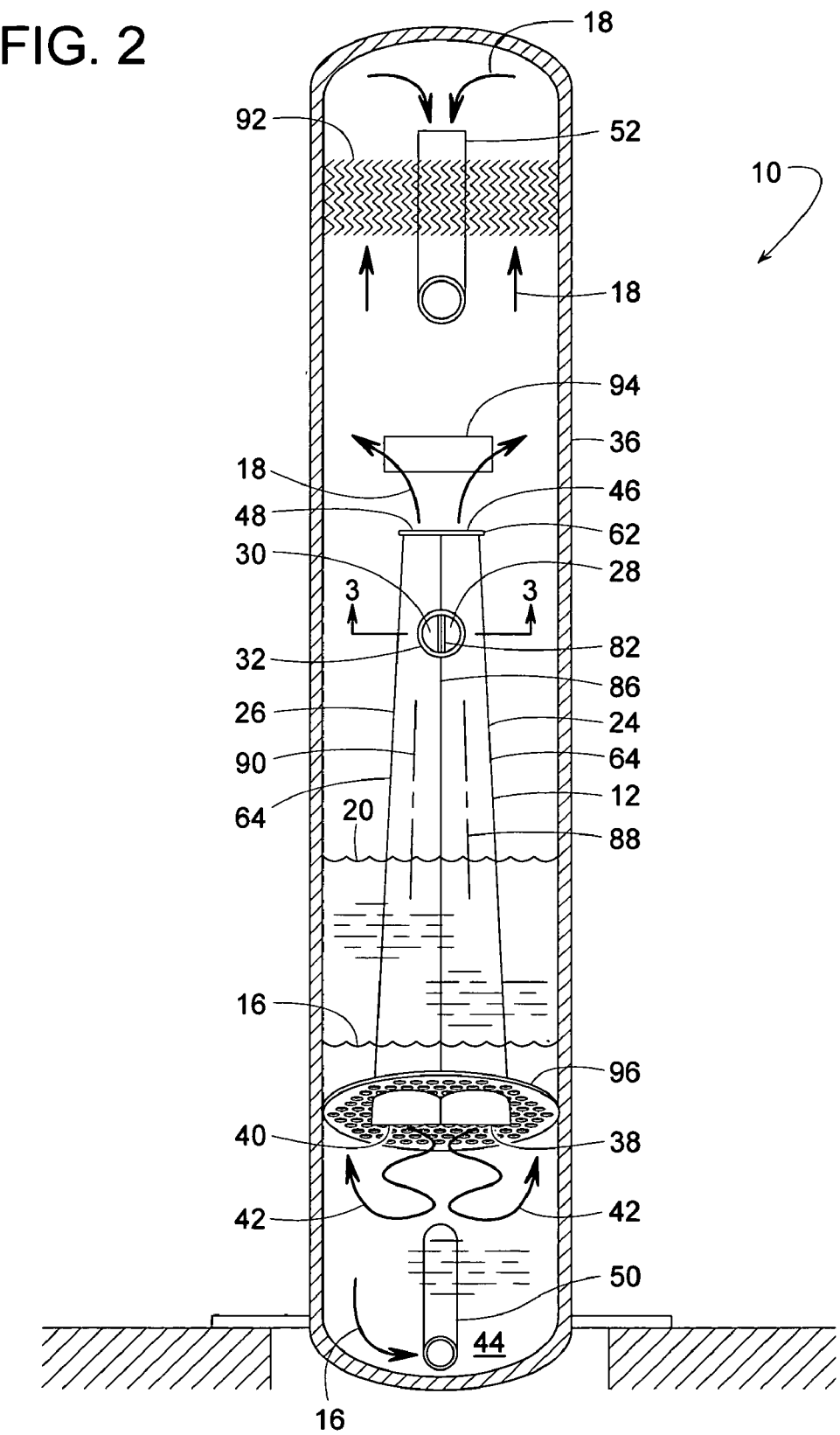
FIG. 2 is a front view of the fluid separator of FIG. 1 with the pressure vessel shown in cross-section.

FIGS. 1 and 2 illustrate a fluid separator 10 with a double-vortex generator 12 that can separate an incoming fluid 14 into its component parts of water 16, gas 18 and oil 20. The proportion of any one component can range from zero to 100% and can fluctuate or change over time. Although separator 10 is particularly suited for processing fluid pumped from an oil well 22, separator 10 could be applied to other applications.

In some embodiments, generator 12 comprises two vortex tubes 24 and 26 with respective fluid inlets 28 and 30 that are fed with fluid 14 via a common inlet pipe 32. Inlet pipe 32 is connected to an inlet 34 of a vertically elongate pressure vessel 36. As fluid 14 from inlet pipe 32 enters tubes 24 and 26 tangentially through inlets 28 and 30, the fluid swirls helically in opposite rotational directions within tubes 24 and 26. The resulting centrifugal force slings the fluid's heavier components, oil and/or water, against the inner wall of tubes 24 and 26. Water 16 and oil 20, if present, then drain along the inner walls of tubes 24 and 26 toward respective liquid outlets 38 and 40. The liquid components 42 then empty into a sump 44 at the bottom of vessel 36, while gas 18 exhausts upward through gas outlets 46 and 48 of tubes 24 and 26 respectively.

Due to the differences in specific gravity of water, gas and oil, the three components 16, 18 and 20 stratify within vessel 36. A water extraction line 50, a gas extraction line 52 and an oil extraction line 54 allow fluids 16, 18 and 20 to be drawn out from within vessel 36 and be conveyed to first, second and third locations 56, 58 and 60 respectively. Any suitable control/sensor system 55 (schematically illustrated) can be used for sensing oil and water liquid levels and controlling the extraction of those liquids. Examples of control/sensor system 55 are well known to those of ordinary skill in the art.

Figure 3:
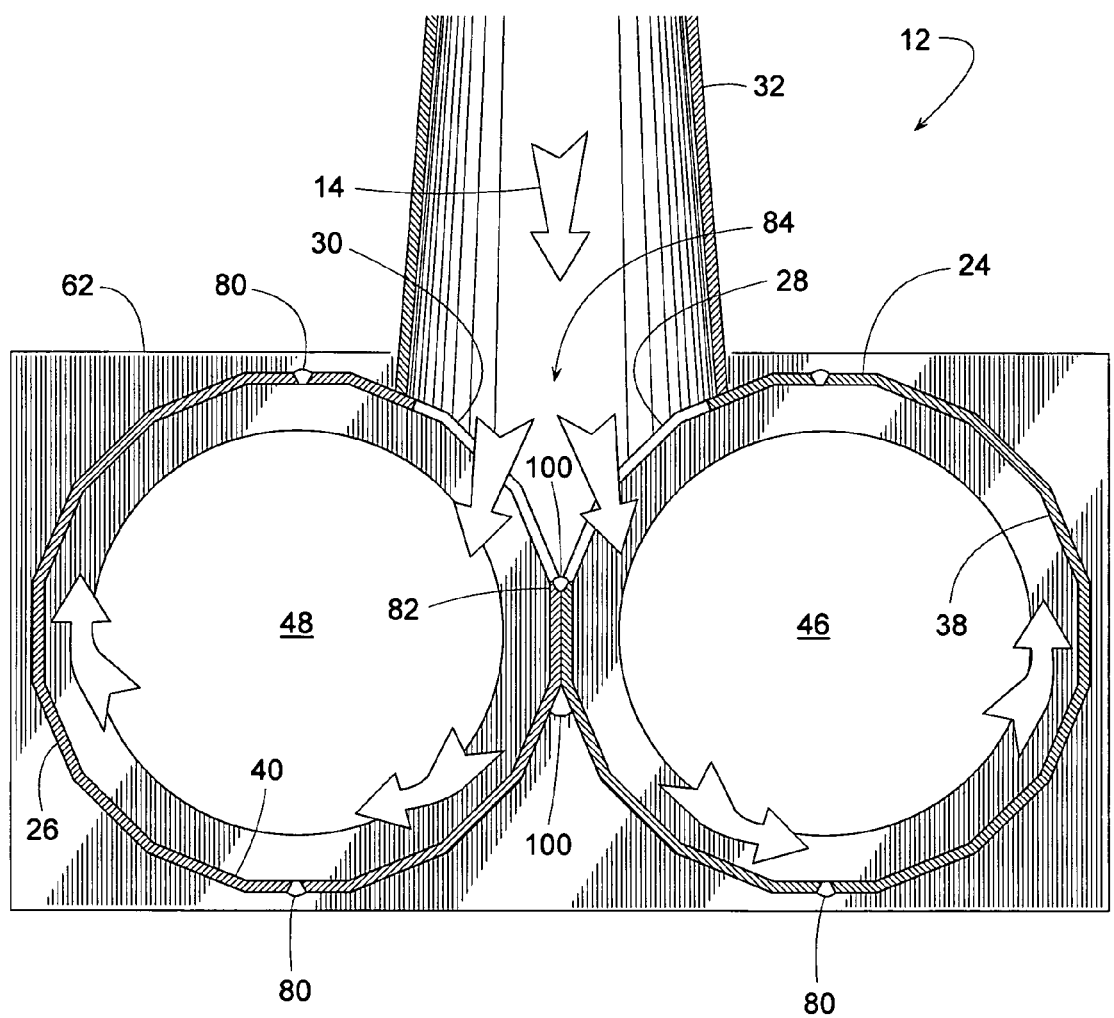
FIG. 3 is a cross-sectional view taken along line 3-3 of FIG. 2.
Figure 4:
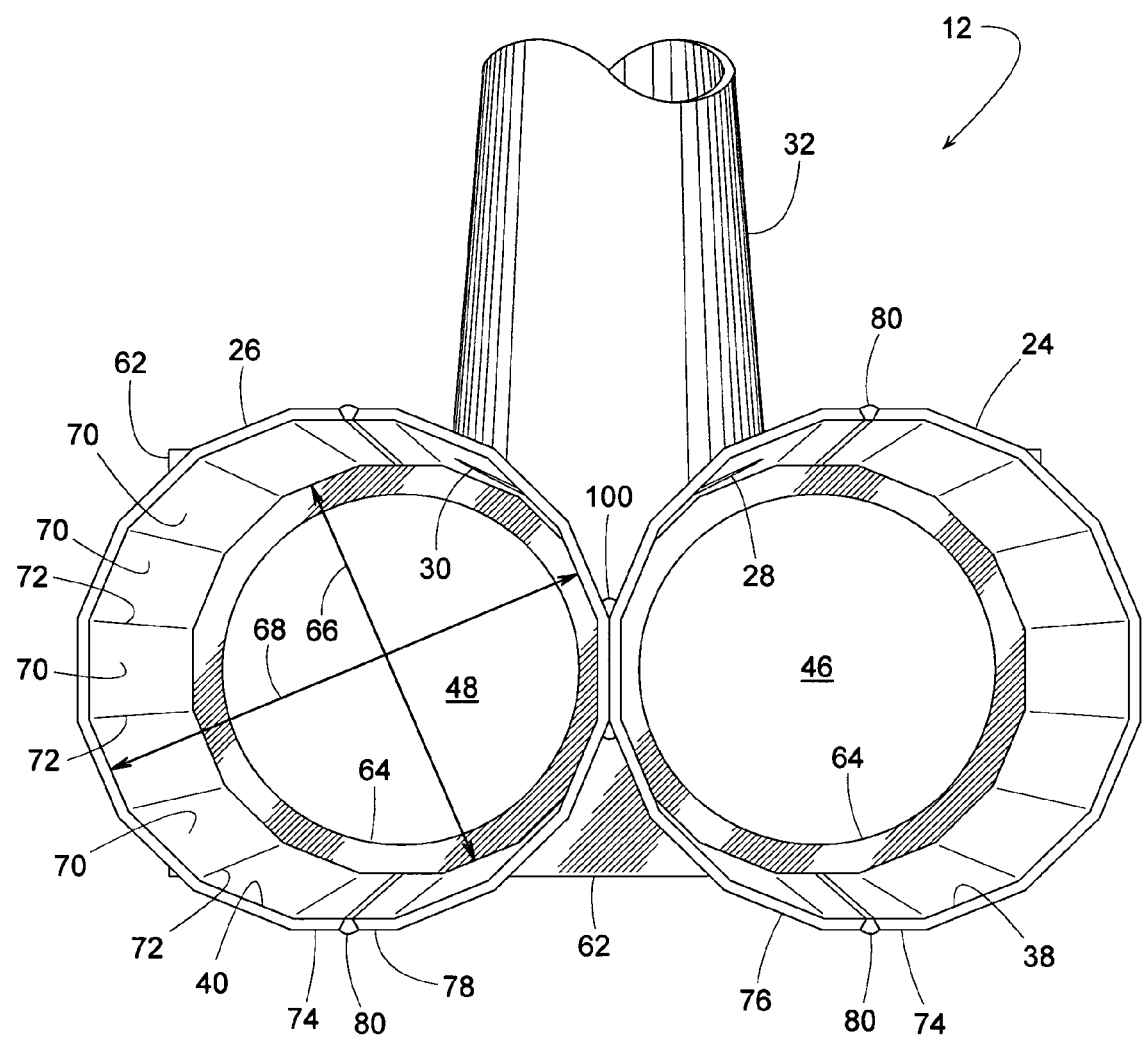
FIG. 4 is an end view similar to FIG. 3 but looking into the liquid discharge end of the generator.
Figure 5:
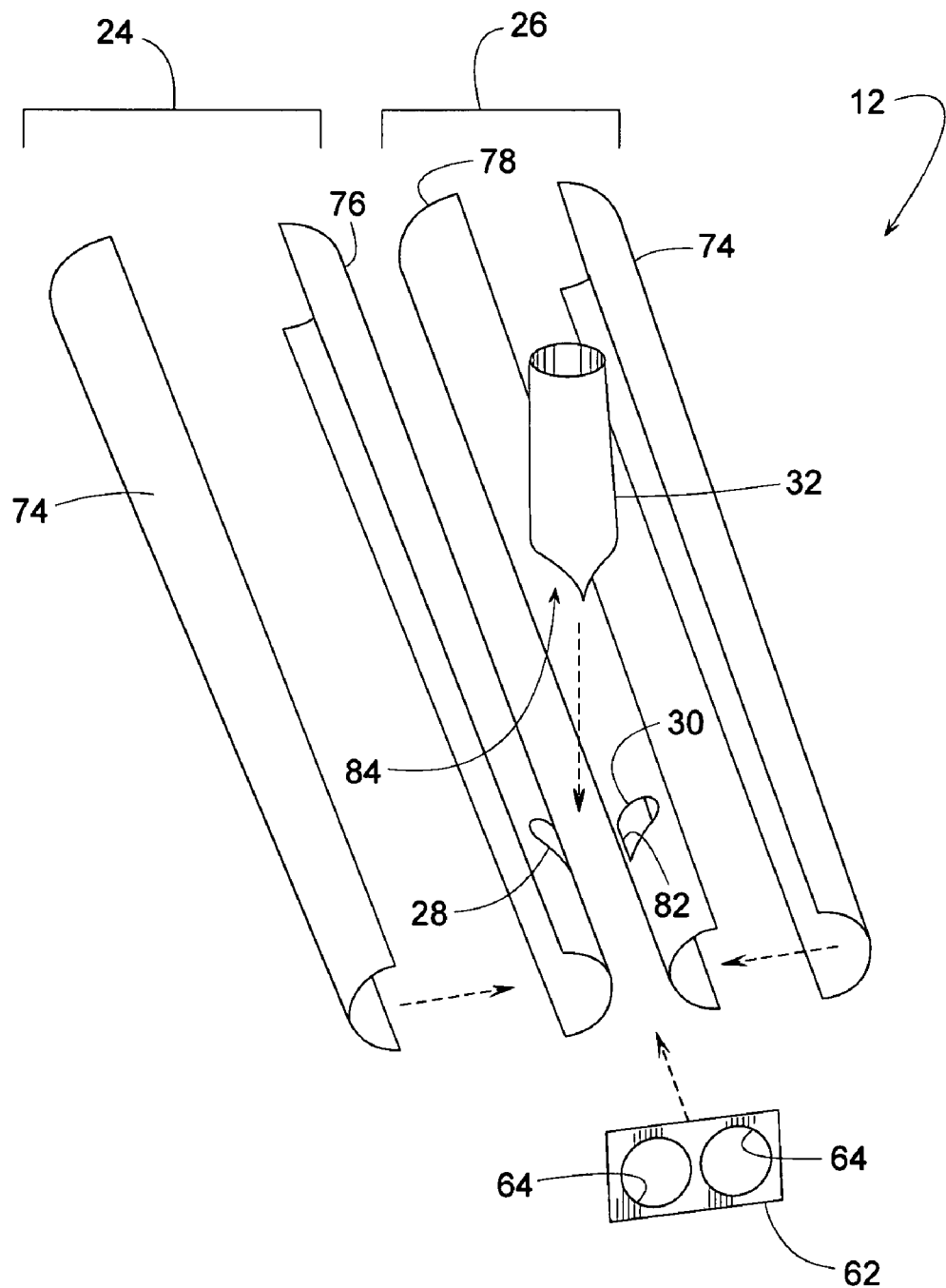
FIG. 5 is an exploded view of the side-by-side double vortex fluid generator used in the separator of FIGS. 1 and 2.

Although the actual construction of generator 12 may vary, FIGS. 3, 4 and 5 show generator 12 preferably comprising a metal fabrication of vortex tubes 24 and 26, inlet pipe 32, and a flange plate 62 that provides an annular flange 64 extending radially inward at each of gas outlets 46 and 48. In cases where some liquid migrates upward along the inner wall of tubes 24 and 26, flange plate 62 helps prevent the liquid from escaping through gas outlets 46 and 48.

To minimize agitation and mixing of water 16 and oil 20 within sump 44, fluid 14 is preferably decelerated before reaching liquid outlets 38 and 40. To do this, vortex tubes 24 and 26 can be made with tapered walls 64 that provide an ever-increasing diameter from gas outlets 46 and 48 to liquid outlets 38 and 40. In some cases, a diameter 66 at gas outlet 48 is about 4-inches, and a diameter 68 at liquid outlet 40 is about 5-inches for a vortex tube having a length of 60-inches. The selected tube diameters provide a helical flow pattern with a relatively tight radius of curvature. The tight radius promotes liquid/gas separation, and the double-tube design handles greater flow volume without resorting to larger, less effective tube diameters.

Although tubes 24 and 26 could be perfectly conical with a perfectly round cross-section, it is advantageous to have a generally polygon cross-section that provides an approximate conical tube. A series of at least five generally flat segments 70, rather than a smoothly curved surface, is readily manufactured by way of a conventional press brake, provided tubes 24 and 26 are each comprised of two "half pipes." Brake creases 72 between adjacent segments 70 also provide shallow channels for liquid drainage, thereby perhaps further promoting the separation of liquid and gas.

For the illustrated embodiment, vortex tube 24 is comprised of a section 74 joined to a section 76, and tube 26 is comprised of a section 78 joined to another section 74; however, various other sections and corresponding joint locations are well within the scope of the invention. Each section 76 and 78 can be welded or otherwise joined to its respective section 74, thereby creating a fillet 80 (preferably a weld bead) that extends continuously or intermittently along the tubes' length between the gas and liquid outlets. The term, "fillet," refers to any element that helps join two adjacent pieces. Examples of a fillet include, but are not limited to, a weld bead (currently preferred), solder, brazing material, adhesive, spot-welded flanges, flanges folded onto themselves, etc. Tubes 24 and 26 are preferably joined to each other by welding, as indicated by weld fillet 80, or by some other suitable means.

Joining vortex tubes 24 and 26 to each other creates a flow splitter 82 between fluid inlet 28 of tube 24 and fluid inlet 30 of tube 26. Referring to weld fillet 100, when inlet pipe 32 is welded to tubes 24 and 26, flow splitter 82 divides a discharge outlet 84 of pipe 32. As fluid 14 flows through pipe 32, flow splitter 82 apportions the fluid preferably evenly between vortex tubes 24 and 26. Inlet pipe 32 can be uniformly cylindrical to provide a generally constant flow velocity, or pipe 32 could be tapered to decelerate the flow before entering vortex tubes 24 and 26.

Referring to FIG. 2, since tubes 24 and 26 are tapered and joined along a tangential line 86 of each tube, longitudinal centerlines 88 and 90 of tubes 24 and 26 are tilted out of parallel alignment with each other (i.e., centerlines 88 and 90 are not parallel).

To improve the operation of fluid separator 10, pressure vessel 36 can be provided with a demister 92, a gas flow deflector 94, and a flow disruptor 96. Demister 92 is a body that provides numerous tortuous passageways for gas 18. Examples of such a body include, but are not limited to, a mass of coarse steel wool, series of fins, matrix of flow obstacles, etc. As gas 18 flows through demister 92, liquid droplets entrained in the gas tend to cling to various surfaces of demister 92. As a result, relatively dry gas is conveyed to gas extraction line 52.

Gas flow deflector 94 is a solid plate mounted in proximity with but spaced apart from gas outlets 46 and 48. Deflector 94 is positioned so as to deflect gas 18 discharged from gas outlets 46 and 48. Deflecting gas 18 breaks up its flow pattern so that gas 18 flows more evenly across demister 92 as opposed to rushing through one localized area of the demister.

Flow disruptor 96 helps breakup strong fluid currents discharged from liquid outlets 38 and 40. Flow disruptor 96 can be a screen or perforated plate that spans the inner diameter of vessel 36 with the lower end of vortex tubes 24 and 26 protruding through disruptor 96. To provide flow disruptor 96 with a greater working area, disruptor 96 can be elliptical and installed at an angle, as shown in FIGS. 1 and 2.

Figure 6:
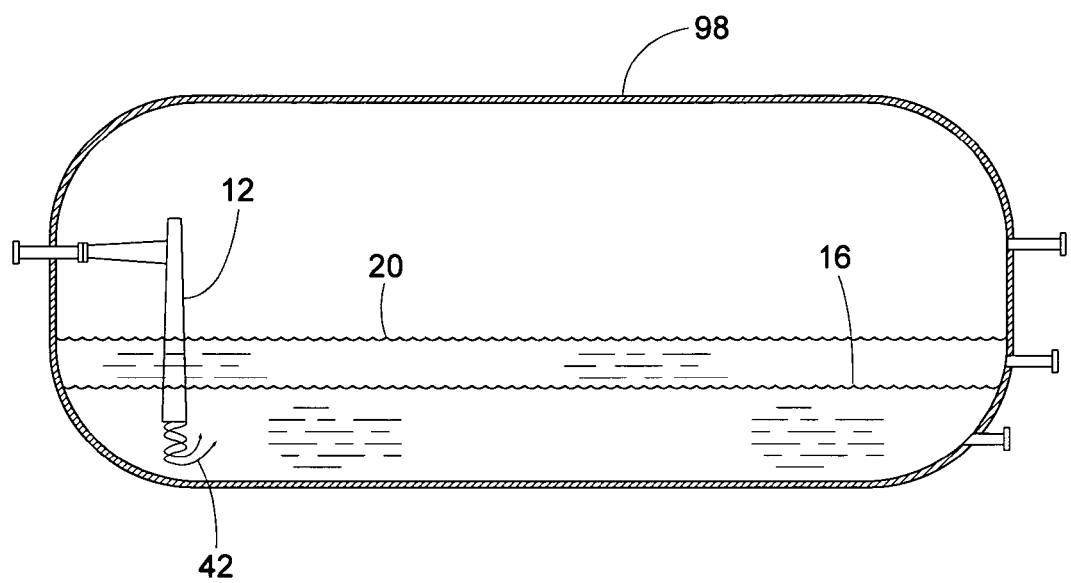
FIG. 6 is a side view of the generator installed in a horizontal pressure vessel.

To further calm and broadly distribute currents in a fluid separator, double-vortex generator 12 can be installed in a pressure vessel 98 that is horizontally elongate, as shown in FIG. 6.

Although the invention is described with respect to a preferred embodiment, modifications thereto will be apparent to those of ordinary skill in the art. The scope of the invention, therefore, is to be determined by reference to the following claims:

The invention claimed is:

1. A fluid separator for separating a liquid and a gas from a fluid, the fluid separator comprising:
    a first vortex tube comprising a first tapered wall that defines a first fluid inlet, a first gas outlet and a first liquid outlet, the first gas outlet is smaller than the first liquid outlet, the first fluid inlet is closer to the first gas outlet than to the first liquid outlet;
    a second vortex tube comprising a second tapered wall that defines a second fluid inlet, a second gas outlet and a second liquid outlet, wherein the first vortex tube defines a first longitudinal centerline the second vortex tube defines a second longitudinal centerline, the first longitudinal centerline and the second longitudinal centerline are tilted out of parallel alignment with each other, the second gas outlet is smaller than the second liquid outlet, the second fluid inlet is closer to the second gas outlet than to the second liquid outlet, the second vortex tube is disposed alongside the first vortex tube such that the first gas outlet is adjacent to the second gas outlet, and the first liquid outlet is adjacent to the second liquid outlet; and
    an inlet pipe defining a discharge outlet connected to the first tapered wall and the second tapered wall such that the inlet pipe is in fluid communication with the first fluid inlet and the second fluid inlet, the first tapered wall and the second tapered wall are joined to each other to create a flow splitter at the discharge outlet such that when the fluid flows through the inlet pipe, the fluid splits between the first vortex tube and the second vortex tube, and upon flowing through the first vortex tube and the second vortex tube, the liquid tends to flow toward the first liquid outlet and the second liquid outlet while the gas tends to flow toward the first gas outlet and the second gas outlet.

2. The fluid separator of claim 1, wherein the first tapered wall comprises a first section and a second section that are joined to each other by way of at least two fillets that extend lengthwise between the first gas outlet and the first liquid outlet.

3. The fluid separator of claim 1, further comprising a gas flow deflector in proximity with but spaced apart from the first gas outlet and the second gas outlet, the gas flow deflector is positioned so as to deflect gas discharged from the first gas outlet and the second gas outlet.

4. The fluid separator of claim 1, wherein the first vortex tube and the second vortex tube are vertically elongate.

5. The fluid separator of claim 1, further comprising a pressure vessel that contains the first vortex tube and the second vortex tube therein, the pressure vessel defines a vessel inlet connected to the inlet pipe, an oil extraction line conveying an oil component of the liquid from the first liquid outlet and the second liquid outlet to a first location beyond the pressure vessel, a water extraction line conveying a water component of the liquid from the first liquid outlet and the second liquid outlet to a second location beyond the pressure vessel, and a gas extraction line conveying the gas from the first gas outlet and the second gas outlet to a third location beyond the pressure vessel.

6. The fluid separator of claim 5, wherein the pressure vessel is vertically elongate.

7. The fluid separator of claim 5, wherein the pressure vessel is horizontally elongate.

8. The fluid separator of claim 5, further comprising a demister disposed within the pressure vessel, wherein the demister is downstream of the first gas outlet and the second gas outlet and is upstream of the gas extraction line.

9. The fluid separator of claim 5, further comprising a flow disruptor disposed within the pressure vessel and being at least occasionally submerged in the liquid.

10. A fluid separator for separating a liquid and a gas from a fluid, the fluid separator comprising:
    a first vortex tube comprising a first tapered wall that defines a first fluid inlet, a first gas outlet and a first liquid outlet, the first gas outlet is smaller than the first liquid outlet, the first fluid inlet is closer to the first gas outlet than to the first liquid outlet, wherein the first tapered wall has a circumferential polygonal cross-section between the first fluid inlet and the first liquid outlet such that the first vortex tube approximates a conical tube;
    a second vortex tube comprising a second tapered wall that defines a second fluid inlet, a second gas outlet and a second liquid outlet, the second gas outlet is smaller than the second liquid outlet, the second fluid inlet is closer to the second gas outlet than to the second liquid outlet, the second vortex tube is disposed alongside the first vortex tube such that the first gas outlet is adjacent to the second gas outlet, and the first liquid outlet is adjacent to the second liquid outlet; and
    an inlet pipe defining a discharge outlet connected to the first tapered wall and the second tapered wall such that the inlet pipe is in fluid communication with the first fluid inlet and the second fluid inlet, the first tapered wall and the second tapered wall are joined to each other to create a flow splitter at the discharge outlet such that when the fluid flows through the inlet pipe, the fluid splits between the first vortex tube and the second vortex tube, and upon flowing through the first vortex tube and the second vortex tube, the liquid tends to flow toward the first liquid outlet and the second liquid outlet while the gas tends to flow toward the first gas outlet and the second gas outlet.

11. A fluid separator for separating a liquid and a gas from a fluid, the fluid separator comprising:
    a first vortex tube comprising a first tapered wall that defines a first fluid inlet, a first gas outlet and a first liquid outlet, the first gas outlet is smaller than the first liquid outlet, the first fluid inlet is closer to the first gas outlet than to the first liquid outlet;
    a flange at the first gas outlet, wherein the flange extends radially inward from the first tapered wall toward a longitudinal centerline of the first vortex tube;
    a second vortex tube comprising a second tapered wall that defines a second fluid inlet, a second gas outlet and a second liquid outlet, the second gas outlet is smaller than the second liquid outlet, the second fluid inlet is closer to the second gas outlet than to the second liquid outlet, the second vortex tube is disposed alongside the first vortex tube such that the first gas outlet is adjacent to the second gas outlet, and the first liquid outlet is adjacent to the second liquid outlet; and
    an inlet pipe defining a discharge outlet connected to the first tapered wall and the second tapered wall such that the inlet pipe is in fluid communication with the first fluid inlet and the second fluid inlet, the first tapered wall and the second tapered wall are joined to each other to create a flow splitter at the discharge outlet such that when the fluid flows through the inlet pipe, the fluid splits between the first vortex tube and the second vortex tube, and upon flowing through the first vortex tube and the second vortex tube, the liquid tends to flow toward the first liquid outlet and the second liquid outlet while the gas tends to flow toward the first gas outlet and the second gas outlet.

* * * * *